(12) United States Patent
Knapp

(10) Patent No.: US 10,822,788 B2
(45) Date of Patent: Nov. 3, 2020

(54) DEVICE FOR COUPLING TWO VERTICAL COMPONENTS

(71) Applicant: Knapp GmbH, Euratsfeld (AT)

(72) Inventor: Friedrich Knapp, Bad Kreuzen (AT)

(73) Assignee: Knapp GmbH, Euratsfeld (AT)

( * ) Notice: Subject to any disclaimer, the term of this patent is extended or adjusted under 35 U.S.C. 154(b) by 0 days.

(21) Appl. No.: 16/488,234

(22) PCT Filed: Feb. 20, 2018

(86) PCT No.: PCT/EP2018/054143
§ 371 (c)(1),
(2) Date: Aug. 22, 2019

(87) PCT Pub. No.: WO2018/153855
PCT Pub. Date: Aug. 30, 2018

(65) Prior Publication Data
US 2019/0382997 A1    Dec. 19, 2019

(30) Foreign Application Priority Data
Feb. 24, 2017    (EP) ..................................... 17157822

(51) Int. Cl.
*E04B 1/26*        (2006.01)
*E04B 1/38*        (2006.01)
(Continued)

(52) U.S. Cl.
CPC .............. *E04B 1/2604* (2013.01); *E04B 1/38* (2013.01); *E04C 3/122* (2013.01); *E04C 3/125* (2013.01);
(Continued)

(58) Field of Classification Search
CPC .. E04B 1/2604; E04B 1/40; E04B 2001/2628; E04B 2001/2664; E04B 2001/2644; E04C 3/18
See application file for complete search history.

(56) References Cited

U.S. PATENT DOCUMENTS 2,962,133 A * 11/1960 Kivett ..................... E04B 1/617
                                                        52/580
3,251,162 A *  5/1966 Strimple ................... E04C 3/18
                                                        52/223.8
(Continued)

FOREIGN PATENT DOCUMENTS

CH        255339 A *  6/1948  ............... E04C 3/18
CH        284016 A *  7/1952  ............... E04C 3/18
(Continued)

OTHER PUBLICATIONS

International Search Report and Written Opinion of the International Searching Authority for PCT/EP2018/054143, dated May 24, 2018, 8 pages.
International Preliminary Report on Patentability of PCT/EP2018/054143, dated Aug. 27, 2019, (6 pages).

*Primary Examiner* — Christine T Cajilig
(74) *Attorney, Agent, or Firm* — Invention Mine LLC

(57) ABSTRACT

The present subject matter relates to a device for coupling two vertical components, comprising a girder made of wood, in particular glued laminated timber, and a connector for each end face of the girder for connecting the end faces to one of the vertical components each. Each connector has two fittings, one of which is mounted via one side on the respective end face of the girder and the other of which can be mounted via one side on the associated vertical component and which fittings can be brought via their other sides into abutment against one another. Further, each connector has two tensioning jaws, which grasp the fittings at diametrical ends and can be tensioned against one another by (Continued)

Figure 1:
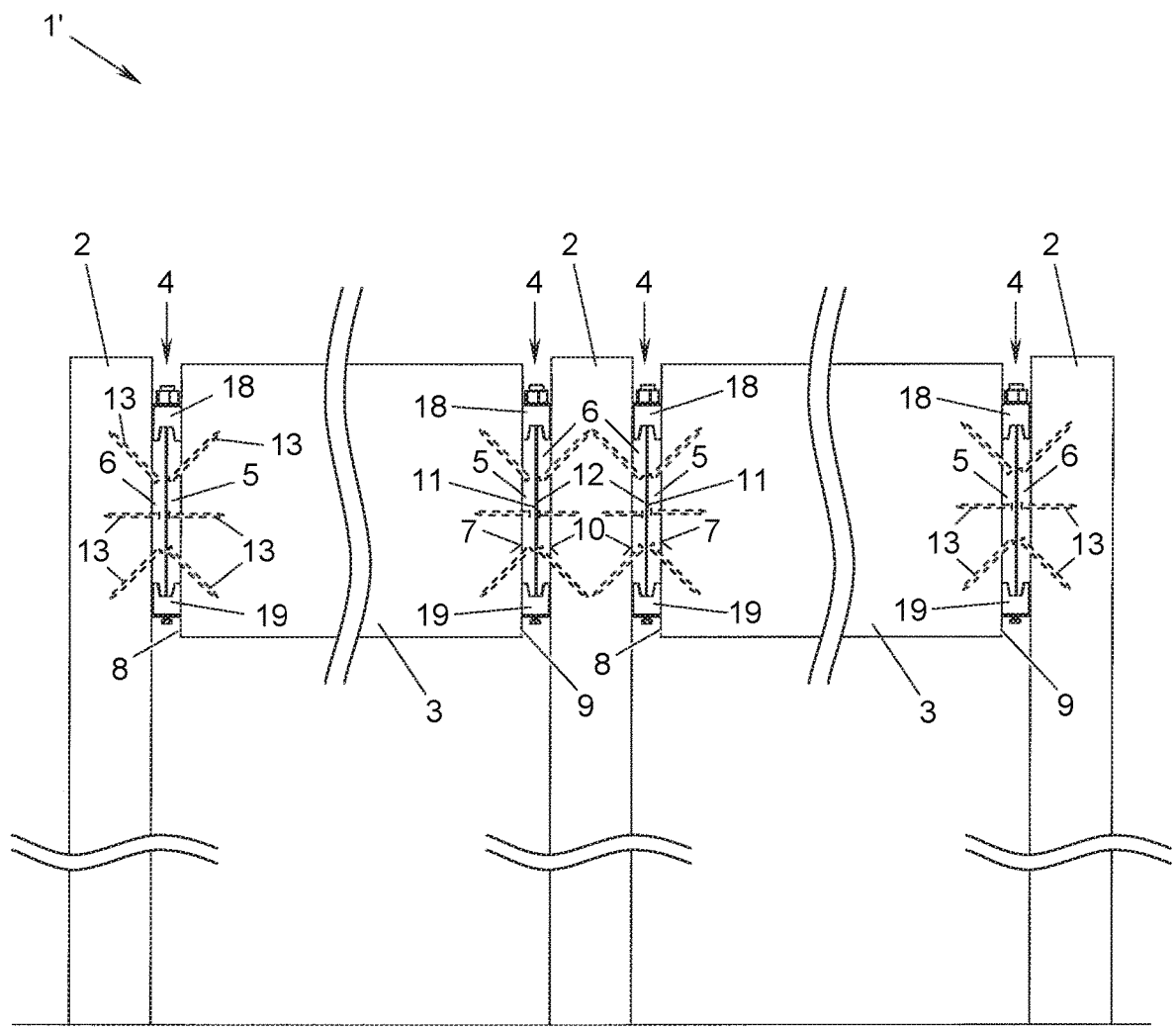

means of at least one tensioning element running approximately parallel to said other sides. The girder has a bottom chord made of steel, which bottom chord is anchored at each end face of the girder to the fitting mounted thereon. At least one tensioning member is provided for tensioning the bottom chord.

11 Claims, 4 Drawing Sheets

(51) Int. Cl.
 *E04C 3/12* (2006.01)
 *E04C 3/18* (2006.01)
(52) U.S. Cl.
 CPC ........ *E04C 3/18* (2013.01); *E04B 2001/2628* (2013.01)

(56) References Cited

U.S. PATENT DOCUMENTS

| | | | |
|---|---|---|---|
| 3,585,771 A | | 6/1971 | Pinniger |
| 5,050,366 A | | 9/1991 | Gardner et al. |
| 7,726,094 B2 | * | 6/2010 | von Morze-Reichartz .................. E04C 3/18 52/831 |
| 2015/0198188 A1 | * | 7/2015 | Angeli .................... E04B 1/215 52/701 |

FOREIGN PATENT DOCUMENTS

| | | | | |
|---|---|---|---|---|
| DE | 2531656 A1 | * | 2/1977 | ............... E04C 3/18 |
| DE | 202013100120 U1 | * | 4/2014 | ............ E04B 2/965 |
| JP | 2005076318 A | | 3/2005 | |

\* cited by examiner

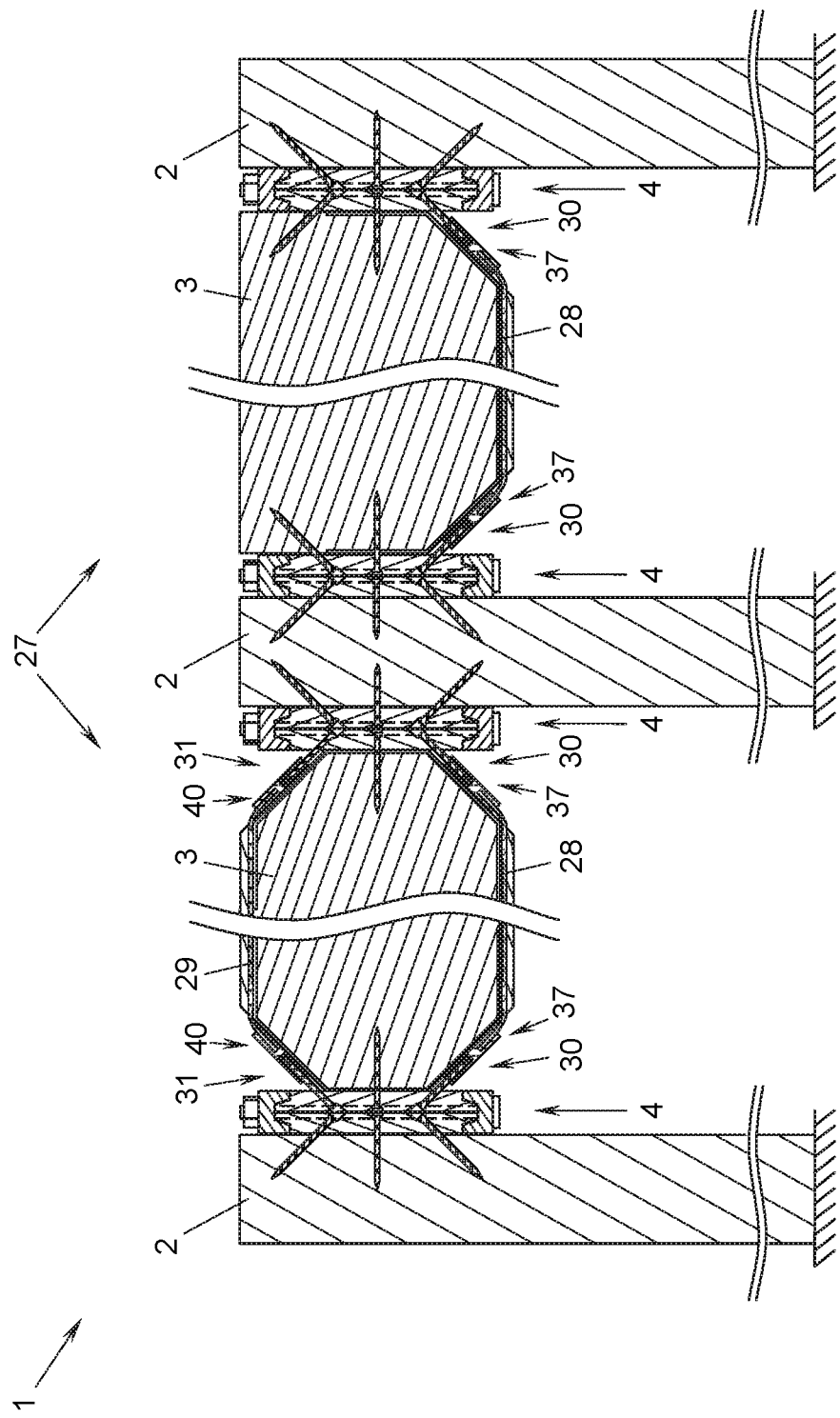

DEVICE FOR COUPLING TWO VERTICAL COMPONENTS

CROSS-REFERENCE TO RELATED APPLICATIONS

This application is a National Phase application of International Application No. PCT/EP2018/054143 filed Feb. 20, 2018 which claims priority to the European Patent Application No. 17 157 822.2 filed Feb. 24, 2017, the disclosures of which are incorporated herein by reference.

TECHNICAL FIELD

The present subject matter relates to a device for coupling two vertical components.

BACKGROUND ART

Some connectors for devices may be particularly suitable for the construction of heavy-duty connections in timber construction, for example for connecting pillars, posts, walls or similar vertical components with the aid of main, secondary and/or cross beams. The fittings and tensioning jaws are usually made of metal, for example high-strength aluminium.

The girders used with such connectors are made of wood, for example glued laminated timber (glulam), in particular laminated beams, have an improved resistance to heat and fire, and with the same load-bearing strength have a lower weight than, for example, steel girders; wood girders however are bulkier. The vertical components, for example walls, pillars, posts, or the like, can likewise be made of wood, but also concrete, masonry or metal.

BRIEF SUMMARY

The objective of the disclosed subject matter is to create a device which connects the vertical components with a simple design and can be used quickly with particularly high load-bearing capability and durability with respect to the coupling of the vertical components, such that greater forces can be taken up in a sustained manner with the same weight or the same overall dimensions.

This objective is achieved in accordance with the disclosed subject matter with a device for coupling two vertical components, comprising a girder made of wood, in particular glued laminated timber, and a connector for each end face of the girder for connecting the end faces to one of the vertical components each, wherein each connector has two fittings, one of which is mounted via one side on the respective end face of the girder and the other of which can be mounted via one side on the associated vertical component and which fittings can be brought via their other sides into abutment against one another, and has two tensioning jaws, which grasp the fittings at diametrical ends and can be tensioned against one another by means of at least one tensioning element running approximately parallel to said other sides, wherein the girder has a bottom chord made of steel, which bottom chord is anchored at each end face of the girder to the fitting mounted thereon, wherein at least one tensioning member is provided for tensioning the bottom chord.

The bottom chord made of steel provides the girder with an increased load-bearing capability with the same weight or same overall dimensions. Due to the anchoring of the bottom chord to the fittings mounted on each end face of the girder, it is possible to pre-assemble the girder, mounted fittings and bottom chord—if desirable also under preload—before the device is brought into the position necessary for the coupling of the vertical components, with access in this position usually being limited. A pre-assembly of this kind can be performed for example on a construction site at a location that is comfortably accessible, or even already at the factory. The subsequent tensioning of the fittings relative to one another with the tensioning jaws is implemented in the usual manner. This results in the vertical components being coupled not merely by way of the wood girder, but at the same time also by way of the steel bottom chord, which increases the forces that can be taken up and, when the bottom chord is tensioned and without significant losses of strength, even allows play between fittings and tensioning jaws of the connection, as is sometimes unavoidable or develops after some time. Such a device therefore enables a particularly long-lasting, flexible and thus also particularly earthquake-resistant coupling of the vertical components.

It is particularly favourable if the bottom chord is formed by at least one steel rope or by at least one bar, wherein a separate tensioning member is provided for each steel rope or each bar. Would girders with bottom chord of this kind are known for example from documents Japanese Patent Application No. 2005/076318A and U.S. Pat. No. 5,050,366. Steel ropes and bars made of steel are equally available in all kinds of embodiments with high tensile strength, wearing steel ropes can be handled particularly easily on account of their flexibility and bars are more rigid and particularly economical. Separate tensioning members for each steel rope or each bar simplify the handling at the time of camping and construction of the device.

The bottom chord can be tensioned for example with the aid of turnbuckles. In a particularly advantageous embodiment, the tensioning member comprises at least one threaded sleeve mounted on the bottom chord and at least one tensioning screw coupled to said fitting and screwed to the threaded sleeve. Even a conventional connector can thus be used with suitable tensioning screws.

In a particularly favourable variant, the girder has a bevel running from its underside to the end face for placement of the tensioning member. For example, the tensioning member can be received spatially in this bevel and, if desired, for example can be subsequently clad in wood together with the connector in order to be able to satisfy aesthetic and/or fire prevention requirements in a simple way.

In order to also achieve a designated direction of the introduction of force of the tensioned bottom chord into the fitting, it is particularly advantageous if the tensioning screw is anchored in a slanted manner on the fitting and the bevel has a bevel angle corresponding thereto. The tensioning member can thus rest against the bevel.

The girder optionally has an edge protection for an edge formed between the underside and the bevel. The edge protection prevents damage to the wooden girder by the bottom chord made of steel and at the same time prevents a loss of the tensioning effect of the bottom chord as a result of a notching of the girder or its edge by the bottom chord.

In order to improve the fire resistance, it is favourable if the bottom chord is received in a wood-covered groove on the underside of the girder.

In a further advantageous embodiment, the girder also has a top chord made of steel on its upper side, which top chord is coupled at each end face of the girder to the fitting mounted thereon, wherein at least one tensioning member for tensioning the top chord is provided. The additional top chord brings about a further reduction of the girder volume, with the same strength.

For the mentioned reasons, the girder has a bevel running from its upper side to the end face, optionally for placement of the tensioning member for the top chord. It is also favourable for fire-prevention reasons if the top chord is received in a wood-covered groove on the upper side of the girder.

Reference can be made to the comments provided above in relation to the bottom chord with regard to further variants of the top chord and advantages thereof.

BRIEF DESCRIPTION OF THE DRAWINGS/FIGURES

Figure 2A:
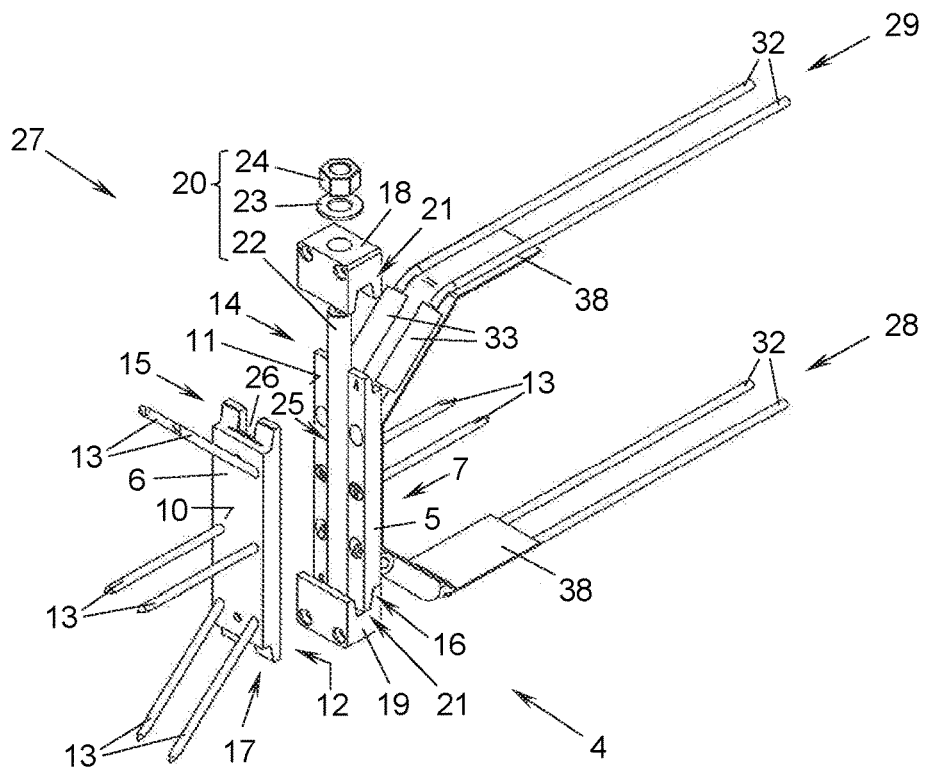
Figure 2B:
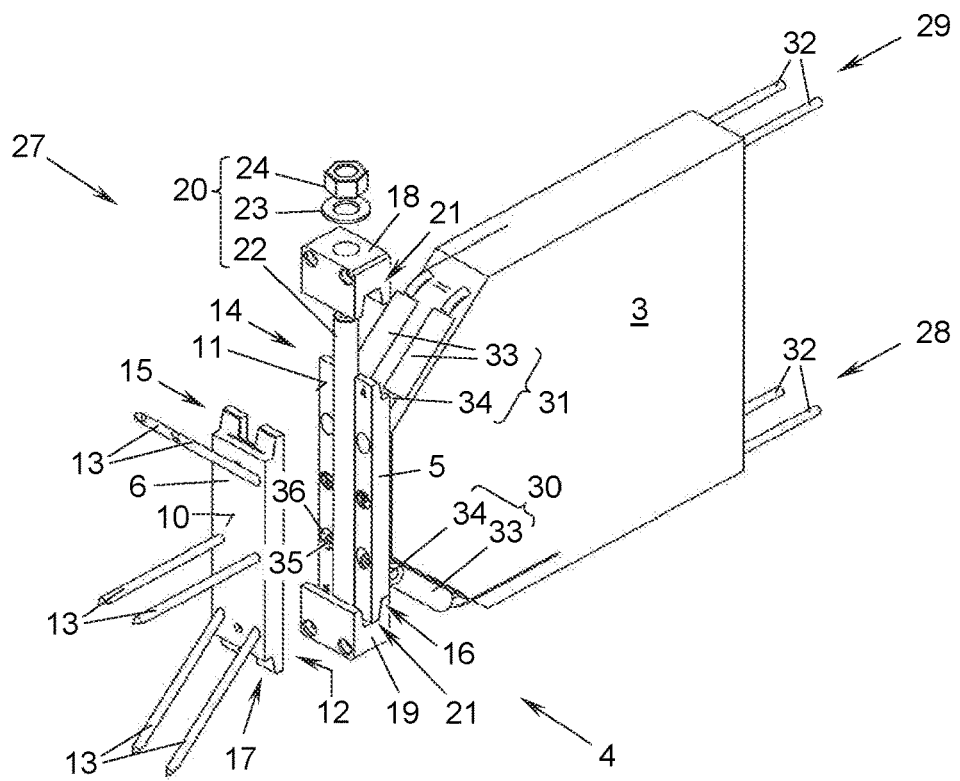
Figure 3:
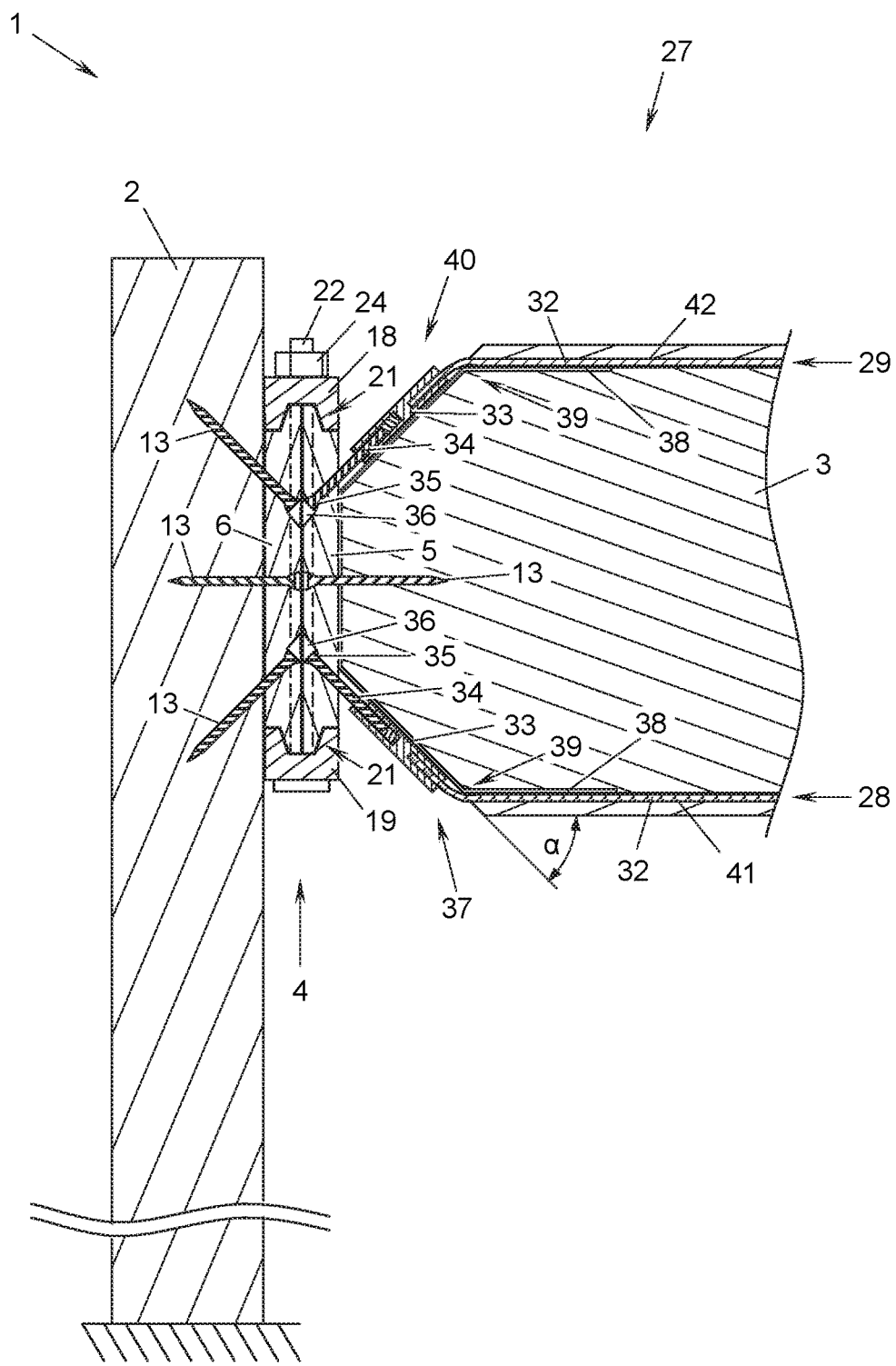

The disclosed subject matter will be explained in greater detail hereinafter with reference to exemplary embodiments shown in the accompanying drawings, in which:

FIG. 1 shows devices according to the prior art in each case in a state coupled to two vertical components, in a side view, FIGS. 2a and 2b each show an end-face detail of the device according to the disclosed subject matter for coupling two vertical components to a connector without (FIG. 1) and with (FIG. 1b) girder in a perspective view obliquely from above, FIG. 3 shows the detail of the device from FIG. 2b in a state coupled to a vertical component in longitudinal section, and FIG. 4 shows two variants of the device according to the disclosed subject matter in each case in a state coupled to two vertical components, in longitudinal section.

DETAILED DESCRIPTION

FIG. 1 shows an arrangement 1' according to the prior art with a plurality of vertical components 2, for example pillars, posts or walls, which are coupled to one another by girders 3 and connectors 4 mounted thereon at the end faces. The girders 3 and/or vertical components 2 can subsequently support further components of the arrangement 1', for example a false ceiling, a roof structure, etc.

The vertical components 2 are, e.g., made of wood, but alternatively can also be made for example of steel, masonry or concrete (with and without reinforcement). The girders 3, for example main, secondary and/or cross beams or laminated beams, are made of wood, for example glued laminated wood (glulam), and the connectors 4 are, e.g., made of metal, for example high-strength aluminium.

In accordance with the example of FIG. 1 each connector 4 has two fittings 5, 6, of which one fitting 5 is mounted via one side 7 on one end face 8, 9 of the girder 3, and the other fitting 6 is mounted via one side 10 on the vertical component 2. When the girder 3 is connected to the vertical component 2, the fittings 5, 6 are brought into abutment against one another via their other sides 11, 12 (see also FIGS. 2a and 2b).

In order to assemble the fittings 5, 6 on the girder 3 or vertical component 2, screws 13, rivets, or the like are used for example, of which at least one can be arranged optionally in a slanted manner depending on the loading direction. In the example of FIG. 1—and also in each of FIGS. 2a to 4—one screw is slanted upwardly, one is oriented approximately horizontally, and one is slanted downwardly. It goes without saying that screws 13 can also be provided in different numbers and orientations, and in particular the two fittings 5, 6 of a connector 2 can have screws 13 provided in a different number and/or orientation.

The fittings 5, 6 are grasped at their diametrical ends 14, 15, 16, 17 (here: the upper ends 14, 15 and the lower ends 16, 17) by two tensioning jaws 18, 19 and, as the girder 3 is connected to the vertical component 2, are brought under tensile stress, i.e., are tensioned relative to one another, by means of at least one tensioning element 20, which runs approximately parallel to the stated other sides 11, 12 of the fittings 5, 6, as is also shown in FIGS. 2a, 2b and 3. Each of the tensioning jaws 18, 19 has a tapered groove 21 for receiving the end 14, 15, 16, 17 of the fittings 5, 6 resting against it and formed with a complementary wedge shape. By tensioning the tension jaws 18, 19 relative to one another, the fittings 5, 6 are thus pressed against one another via their stated other sides 11, 12.

For example, a threaded pin 22 is a potential tensioning element 20, which, as is known, can be tensioned for example with a washer 23 and nut 24. The threaded pin 22 of the at least one tensioning element 20 is optionally received in grooves 25, 26 (FIGS. 2a, 2b) in the stated other sides 11, 12 of the fittings 5, 6.

An arrangement 1 with a device 27 according to the disclosed subject matter for coupling two vertical components 2 will be explained hereinafter with reference to the examples shown in FIGS. 2a to 4, wherein identical or comparable elements have been provided with the same reference signs as in FIG. 1 in order to facilitate understanding.

In the device 27 according to the disclosed subject matter the girders 3 have a bottom chord 28 made of steel and an optional top chord 29, likewise made of steel, in order to increase stability, which chords are each anchored to the fittings 5 mounted on each end face 8, 9 of the girder 3. The vertical components 2 are also coupled to one another on both sides of the girder 3 via the connectors 4. In order to tension the bottom chord 28, at least one tensioning member 30 (and at least one tensioning member 31 for tensioning the top chord 29 if present) is provided. The bottom chord 28 (and also the optional top chord 29) is formed by at least one steel rope 32 or by at least one bar.

In the example of FIGS. 2a and 2b the bottom and top chords 28, 29 are formed by two steel ropes 32 each. A separate tensioning member 30, 31 is provided for each steel rope 32 or each bar; alternatively, a common tensioning member 30, 31 for all steel ropes 32 or bars of the bottom chord 28 or of the top chord 29 could also be provided.

Tensioning members 30 can be provided in the region only of one end face 8 of the girder 3, i.e., only at one end-face end of the bottom chord 28, and at the same time the bottom chord 28 can be fixedly anchored to the fitting 5 which is mounted on the other end face 9 of the girder 3; alternatively, a tensioning member 30 can be provided at any other point, for example approximately in the middle of the bottom chord 28, and at the same time the bottom chord 28 can be fixedly anchored to the fittings 5 mounted on both end faces 8, 9 of the girder 3. In the examples of FIG. 4, the bottom chord 28 is anchored to a corresponding fitting 5 at both end faces 8, 9 of the girder 3, in each case via a tensioning member 30.

In the examples of FIGS. 2a to 4, the tensioning member 30 comprises at least one threaded sleeve 33 mounted on the bottom chord 28 and at least one tensioning screw 34, which at one end is coupled to the fitting 5 mounted on the end face 8, 9 of the girder 3 and at the other end is screwed to the threaded sleeve 33. The described coupling of the tensioning screw 34 to the fitting 5 is achieved here by a head 35 of the tensioning screw 34, which head is retained in a borehole 36 in the fitting 5. The borehole 36 is optionally a stepped or countersunk borehole, so that the screw head 35 does not protrude on the stated other side 11 of the fitting 5.

Alternatively to a threaded sleeve 33 and tensioning screw 34, the tensioning member 30 can be embodied in another way known to a person skilled in the art, for example in the form of a turnbuckle or by an external thread on the bottom chord—for example in one embodiment as a bar with threads at its ends—with a complementary threaded sleeve anchored to the fitting 5.

The underside (and also the upper side) of the girder 3 can be arranged adjacently to each end face 8, 9 on one or both sides at a right angle, as is shown in the example on the right-hand side of FIG. 4 for the upper side of the girder 3, and at the same time the bottom chord 28 can also run in a straight line over the entire underside of the girder 3 and optionally can be anchored to the fitting 5, likewise at a right angle.

In the examples of FIGS. 2a to 4, the girder 3 by contrast, on one or both of its end faces 8, 9, has a bevel 37 running from its underside to the end face 8 for placement of the tensioning member 30. The bevel 37 on the one hand causes a deflection of the bottom chord 28 and thus of the force direction acting on the girder 3 or the fitting 5, which can be adapted to the requirements by way of the bevel angle α (FIG. 3) (and the borehole 36 through the fitting 5). On the other hand, the bevel angle α can be adapted to the use of an existing fitting 5 or connector 4 by forming the bevel angle α in a manner corresponding to the tensioning screw 34 anchored in a slanted manner to the provided fitting 5.

The girder 3 optionally has an edge protection 38, for example made of sheet metal or a plastic or composite material having good sliding properties, which protects at least the edge 39 formed between the underside of the girder 3 and bevel 37 against a notching by the bottom chord 28 and facilitates the sliding of said edge during the tensioning process. The edge protection 38 can optionally be narrower than the girder 3 itself, and at the same time may cover the edge 39 for example only in the region of the bottom chord 28. If desired, the edge protection 38, as in the examples of FIGS. 2a to 4, can run from the underside of the girder 3 via the bevel 37 and the end face 8 to the upper side of the girder 3.

The above details regarding the variants of the bottom chord 28, the tensioning member 30 and the bevel 37 on the underside of the girder 3 apply similarly in accordance with the examples of FIGS. 2a to 4 to the top chord 29, the tensioning member(s) 31 thereof, and an optional bevel 40 on the upper side of the girder 3.

Furthermore, the bottom and/or top chord 28, 29 can be received in a wood-covered groove 41 or 42 on the underside or upper side of the girder 3, if desired for example for aesthetic reasons or in order to improve the fire resistance.

The disclosed subject matter is not limited to the presented embodiments, but includes all variants, modifications and combinations that fall within the scope of the accompanying claims.

What is claimed is:

1. A device for coupling two vertical components, comprising:
   a girder made of wood and having two end faces; and
   a connector for each respective end face of the girder for connecting the respective end face to a respective one of the vertical components,
   wherein each connector has two fittings, one of which is mounted via one side on the respective end face of the girder and the other of which is configured to be mounted via one side on the associated vertical component and which fittings are configured to be brought via their other sides into abutment against one another,
   wherein each connector has two tensioning jaws, which grasp the fittings at diametrical ends and are configured to be tensioned against one another by means of at least one tensioning element running approximately parallel to said other sides,
   wherein the girder has a bottom chord made of steel, which bottom chord is anchored at each end face of the girder to the fitting mounted thereon, and
   wherein at least one tensioning member is provided for tensioning the bottom chord.

2. The device according to claim 1,
   wherein the bottom chord is formed by at least one steel rope or by at least one bar,
   wherein a separate tensioning member is provided for each steel rope or each bar.

3. The device according to claim 1, wherein the tensioning member comprises at least one threaded sleeve mounted on the bottom chord and at least one tensioning screw coupled to one of the fittings and screwed to the threaded sleeve.

4. The device according to claim 1, wherein the girder has a bevel running from an underside of the girder to the end face for placement of the tensioning member.

5. The device according to claim 3,
   wherein the girder has a bevel running from an underside of the girder to the end face for placement of the tensioning member, and
   wherein the tensioning screw is anchored in a slanted manner on said one of the fittings and the bevel has a bevel angle corresponding thereto.

6. The device according to claim 4, wherein the girder has an edge protection for an edge formed between the underside and the bevel.

7. The device according to claim 1, wherein the bottom chord is received in a wood-covered groove on the underside of the girder.

8. The device according to claim 1, wherein the girder also has a top chord made of steel on an upper side of the girder, which top chord is coupled at each end face of the girder to the respective fitting mounted thereon, wherein at least one tensioning member is provided for tensioning the top chord.

9. The device according to claim 8, wherein the girder has a bevel running from the upper side of the girder to the end face for placement of the tensioning member for the top chord.

10. The device according to claim 8, wherein the top chord is received in a wood-covered groove on the upper side of the girder.

11. The device according to claim 1, wherein the girder is made of glued laminated timber.

* * * * *